United States Patent [19]

Donofrio et al.

[11] Patent Number: 4,485,329

[45] Date of Patent: Nov. 27, 1984

[54] CRT INCORPORATING X-RAY ABSORBING MEANS

[75] Inventors: Robert L. Donofrio, Elbridge; Peter H. Rollason, Cayuga; Mahlon B. Fisher, Skaneateles, all of N.Y.

[73] Assignee: North American Philips Consumer Electronics Corp., New York, N.Y.

[21] Appl. No.: 375,902

[22] Filed: May 7, 1982

[51] Int. Cl.[3] .......................... H01J 29/86; H04N 5/65

[52] U.S. Cl. ...................................... 313/478; 313/479; 358/247

[58] Field of Search ................ 313/478, 479; 358/247, 358/253, 245

[56] References Cited

U.S. PATENT DOCUMENTS 2,734,142 2/1956 Barnes ............................ 358/247 X
3,164,672 1/1965 Spear et al. ........................ 358/247
3,185,020 5/1965 Thelen ............................... 350/164
3,422,298 1/1969 De Gier ............................ 313/478
3,543,073 11/1970 Sheldon ......................... 313/478 X
4,204,231 5/1980 Permenter .......................... 358/247

FOREIGN PATENT DOCUMENTS 2845790 4/1979 Fed. Rep. of Germany ...... 378/203

*Primary Examiner*—Palmer Demeo
*Attorney, Agent, or Firm*—T. A. Briody; J. Oisher; J. C. Fox

[57] ABSTRACT

A cathode ray tube has discrete x-ray absorbing means integrally associated with the face region thereof to beneficially attenuate the x-radiation emanating peripherally and forwardly therefrom. Attached to the tube face is a closed frame-like resilient gasket impregnated with x-ray absorbing material. Superposed thereon is a cover plate of x-ray absorbing glass. This is adhered to the tube face by a layer of substantially transparent adhesive confined within the gasket.

9 Claims, 4 Drawing Figures

CRT INCORPORATING X-RAY ABSORBING MEANS

TECHNICAL FIELD

The present invention relates to a cathode ray tube (CRT) incorporating x-ray absorbing means and more particularly to a tube having such means integrally associated with the face region thereof.

BACKGROUND OF THE INVENTION

Cathode ray tubes are of types adaptable to a number of specialized utilizations including entertainment displays, monitor displays; direct read-out data displays, and projection displays for large screen applications. Whatever the application, optimum resolution, contrast, and brightness are among the commonly desired characteristics. During the course of tube development to enhance brightness, operational screen potentials have been increased to the present 30 to 40+KV range wherein the generation of x-rays becomes an important consideration.

For instance, in a CRT projection system, wherein high voltage tube operation is utilized in order to provide bright imagery, a separate lead glass shield is positioned between the face of the tube and the projection lens system to attenuate the x-radiation projected from the tube. In a combination of this type, there is an inherent reduction in attainable contrast and a noticeable loss in brightness due to reflection losses resultant from the front and back surfaces of the lead glass shielding member. In certain instances an 8 percent loss in brightness has been evidenced. Additionally, extra shielding provisions are often required in the system to achieve attenuation of the x-rays emitted peripherally from the screen area of the tube.

In a CRT projection system, important considerations in addition to brightness, include implosion protection, reduced glare and enhanced contrast.

These considerations, particularly implosion protection, have been met in the prior art by a transparent cover plate affixed to the CRT face by an intermediate peripherally confined adhesive material. Such, for example, is disclosed in U.S. Pat. No. 4,204,231, wherein the adhesive material is peripherally confined by a strip of pressure-sensitive tape applied around the face area in a manner to cover the jointure region thereof. Of course, such structures offer essentially no protection against the emanation of x-rays.

DISCLOSURE OF THE INVENTION

It is an object of the invention to reduce and obviate the aforementioned disadvantages evidenced in the prior art.

Another object of the invention is the provision of an improved cathode ray tube having x-ray absorbing means integrally associated with the face area to effect protection for both the peripheral and frontal regions thereof.

An additional object of the invention is to improve brightness and contrast by reducing reflection losses within the integrated x-ray absorbing system.

An additional object of the invention is to provide implosion protection.

These and other objects and advantages are achieved in one aspect of the invention wherein x-ray absorbing means are integrally associated with the face region of discrete CRT types, such as those employed particularly in projection applications and in certain classes of direct read-out display utilizations wherein bright imagery is required.

In one aspect of the invention, there is provided a layered structure adhered to the front of the tube. This is basically comprised of a transparent cover plate affixed to the CRT face by an intermediate peripherally confined x-ray absorbing adhesive material. The present invention differs markedly from the prior art by incorporating additional and highly beneficial features effecting synergistic x-ray absorbing results. Thus, the invention provides protection from harmful x-rays emanating from high voltage operating tubes which is of prime consideration. Such protection is facilely achieved by the invention while additionally minimizing deleterious optical reflections in the system.

In the combination comprising the invention, a basic component, directly associated with the tube face region, is an open frame-like gasket of uniform predetermined thickness formed of a composition impregnated with x-ray absorbing material. This gasket is shaped as a one-piece continuous-wall member having an outer surface substantially conforming to the perimetrical shape of the CRT face, and an inner surface circumscribing the utilized facial area of the tube. Thus, the wall width of the gasket is defined by the material intermediate the outer and inner surfaces. The thickness of the gasket is defined by front and rear surfaces, with the rear surface being adhered to the exterior peripheral region of the tube face area.

In an alternate embodiment of the invention, the gasket has an integral skirt portion extending therefrom in a peripheral manner to encompass the frontal region of the tube. This embodiment is particularly useful for tube types evidencing the generation of high levels of x-radiation.

The material of the gasket is a resilient closed cell polymer substance, such as a silicone rubber composition. The wall of the resilient gasket contains a plurality of spaced-apart discrete piercings which extend through the outer and inner surfaces to provide self-closing port means therein.

The x-ray absorbing material impregnated into the gasket is at least one particulate metal selected from the group consisting essentially of, lead, tungsten, tantalum, and molybdenum. When used individually, lead is included in the amount of substantially 8 to 15 percent by volume; tungsten in the amount of substantially 6 to 10 percent; tantalum in the amount of substantially 7 to 11 percent; and molybdenum in the amount of substantially 10 to 14 percent.

A substantially transparent cover plate of x-ray absorbing glass, having front and rear surfaces and being of a size greater than the utilized facial area of the tube, is superposed upon and peripherally adhered to the front surface of the gasket. The front surface of the cover plate may have a deposition of anti-reflection coating thereon to minimize internal and external reflections.

Intermediate the x-ray absorbing cover plate and the face of the tube is a confined layer of substantially transparent adhesive material. This completely fills the facial region encompassed by the gasket and effects bonding of the cover plate to the face area of the tube. The injection of the confined adhesive material is accomplished by way of the aforementioned self-closing port piercings through the wall of the gasket during fabrication of the combination.

BEST MODE FOR CARRYING OUT THE INVENTION

Figure 1:
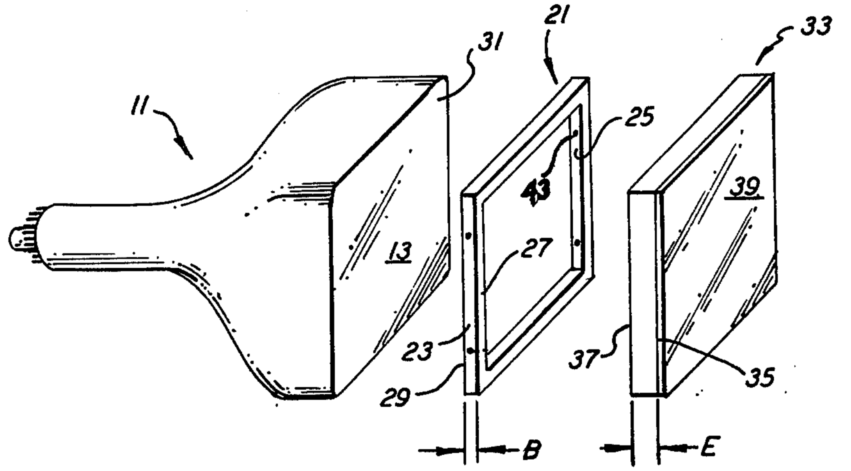
FIG. 1 is a perspective illustration showing a cathode ray tube and the individual components comprising the structure of the invention.
Figure 2:
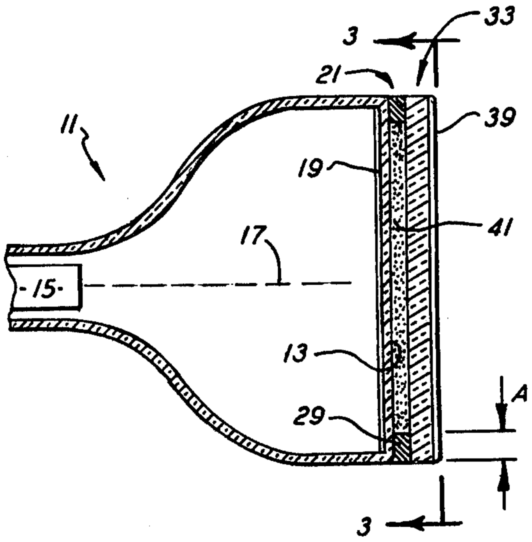
FIG. 2 is a side view of the tube showing the structure of the invention in cross-section.

For a better understanding of the present invention, together with other and further objects, advantages and capabilities thereof, reference is made to the following disclosure and appended claims in conjunction with the accompanying drawings.

With reference to the drawings, there is shown a cathode ray tube 11, such as for example, a 6 or 7 inch projection tube having a frontal face area 13. While the drawings depict a tube having a substantially rectangular flat-surfaced facial region, such is not to be considered limiting, as the invention is equally applicable to tubes having round and ovate frontal shapings and curved facial areas.

The CRT 11 has electron generating means 15 from which emanates at least one electron beam 17. This beam is moved and directed to impinge and excite the phosphor components in the cathodoluminescent screen 19, thereby creating discrete imagery that is visible on the face of the tube. Since the screen potential, in this instance, is of a high value in the order of 30 to 40 KV, harmful x-rays are generated which are transmitted both forwardly and peripherally through the face region of the tube. It is the principal purpose of the combination comprising the present invention to provide means to absorb this deleterious radiation, while at the same time enhancing brightness and contrast of the display imagery.

The basic concepts of the invention will be first considered. Directly associated with the frontal face area 13 of the CRT is an open frame-like gasket 21 of uniform thickness formed of a resilient composition impregnated with x-ray absorbing materials. This component is shaped as a one-piece continuous-wall member having an outer surface 23 substantially matching the perimetrical size of the CRT face, and an inner surface 25 circumscribing the utilized facial area of the tube. Thus, the gasket evidences a wall width "A" defined by the gasket material intermediate the outer and inner side surfaces. The material thickness "B" of the gasket is defined by front 27 and rear 29 surfaces, of which the rear surface is adhered to the exterior peripheral region 31 of the tube face area 13.

Superposed upon and peripherally affixed to the front surface 27 of the gasket 21 is a substantially transparent cover plate 33 of x-ray absorbing glass, such as a lead containing glass conventionally utilized for shielding applications. This component evidences front 35 and rear 37 surfaces, and is of a size greater than the utilized facial area of the tube. The front surface 35 has a deposition of an anti-reflective coating 39 thereon. Such coatings are known in the art. An example of a suitable deposition is the three layer anti-reflection coating disclosed in U.S. Pat. No. 3,185,020 and assigned to Optical Coating Laboratory, Inc., Santa Rosa, Calif.

Intermediate the face 13 of the CRT and the cover plate 33 of x-ray absorbing glass is a confined layer of a substantially transparent adhesive material 41. This completely fills the facial region encompassed by the gasket 21 and bonds the cover plate to the tube. The adhesive material is substantially optically matched to the contiguous glass components to form a single optical interface. A suitable adhesive is designated as Dow Epoxy Resin D.E.H. 720 with an acid type hardner. Obviously, other resins which evidence optical matching and provide adequate bonding are equally applicable. Such materials are readily available commercially.

Certain important aspects of the invention are now considered in greater detail.

The resilient gasket 21 is formed of a closed polymer composition, substantially free of foam structure, such as silicone rubber. This gasket material contains a substantially homogeneous impregnation of an x-ray absorbing material in the form of at least one particulate metal selected from the group consisting essentially of lead (Pb), tungsten (W), tantalum (Ta), and molybdenum (Mo).

The wall width "A" of the resilient impregnated gasket falls substantially within the range of about 200 mils (5.080 mm) to 750 mils (19.04 mm). For example, to provide adequate peripheral shielding for x-rays generated by 30 to 35 KV screen potentials, a gasket width of 250 mils (6.35 mm) will produce shielding equivalent to substantially a 20 mil (0.058 mm) covering of lead when containing one of the following individual elements:

| Metal | Percent Range (by volume) |
|---|---|
| Lead | substantially 8 to 15 |
| Tungsten | substantially 6 to 10 |
| Tantalum | substantially 7 to 11 |
| Molybdenum | substantially 10 to 14 |

In each instance, a higher percentage can be added, but such is not necessary for adequate shielding requirements. Furthermore, it is recognized that it is within the scope of the concept to discretely combine smaller amounts of two or more of the above-noted minutely particled metals to achieve the desired x-ray attenuation.

Figure 3:
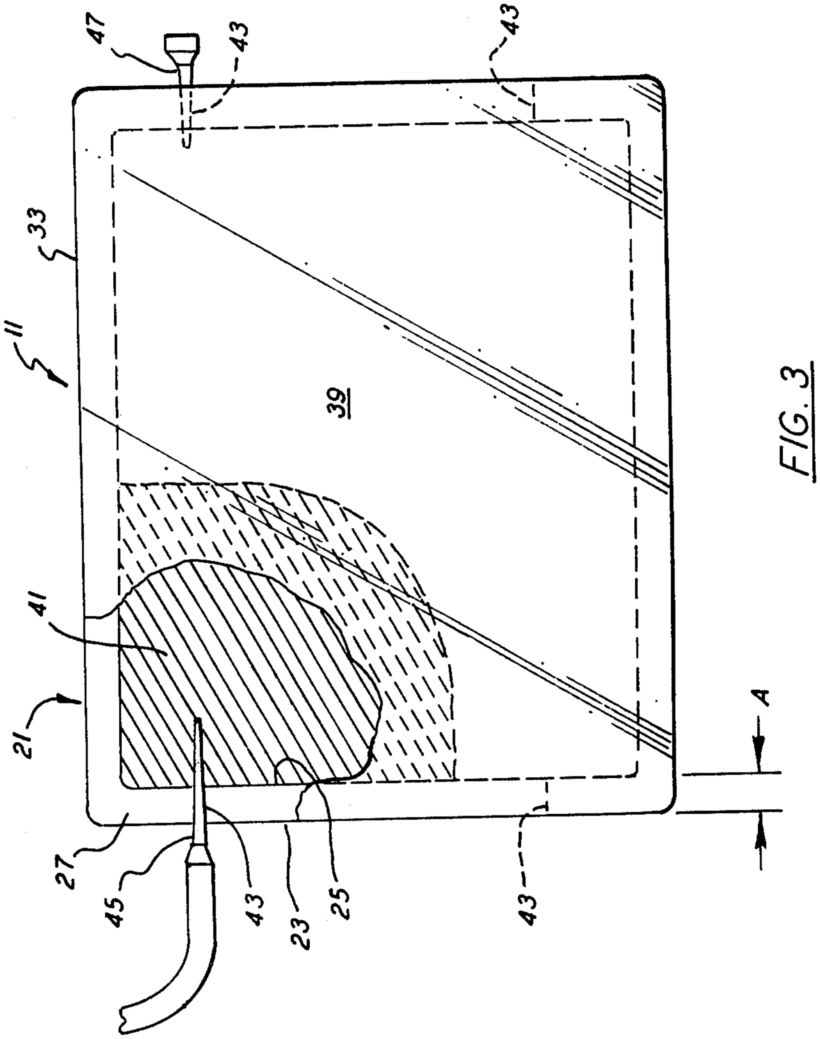
FIG. 3 is a partially sectioned frontal view of the tube taken along the line 3—3 of FIG. 2, showing utilization of port means during fabrication.

The gasket wall thickness "B" is determined primarily by the amount of resin required to provide secure bonding of the glass cover shield 33 to the tube face area 13, and secondarily by the shield-to-tube spacing needed to facilitate introduction of the adhesive resin 41 into the gasket-defined cavity. In accordance therewith, the gasket thickness "A" is usually within the range of substantially 140 mils (3.556 mm) to 260 mils (6.604 mm). As shown in FIGS. 1 and 3, the gasket wall has a plurality of discrete piercings 43 therein extending through the outer 23 and inner 25 wall surfaces to provide self-closing port means therein. Usage of these ports during tube fabrication is shown in FIG. 3 wherein a resin injection nozzle 45 is inserted through one of the port piercings 43. In conjunction therewith, an exhaust tube 47 is inserted through another of the port piercings to facilitate removal of the air from the gasket cavity as the liquid resin 41 is injected thereinto. The nozzle and exhaust tube may be moved to other piercings as the need requires to assure the deposition of a full layer of resin. Upon removal of the nozzle and exhaust ports, the pierced wall material expands to its normal orientation thereby providing self-closing port means. Upon application, the resin is cured or set by subjecting the tube to an exemplary heat treatment of substantially 180° F. for a time period of approximately one hour.

Figure 4:
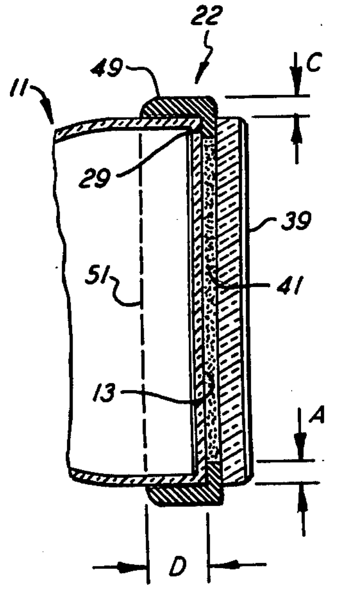
FIG. 4 is a side cross-sectional view of the frontal portion of the tube showing the structure of an alternate embodiment of the invention.

An alternate embodiment of the invention is shown in FIG. 4, wherein the gasket member 22 has an integral skirt portion 49 extending rearward from the rear surface 29. This embodiment, which provides additional shielding for the periphery of the face region, is advantageous for tube types generating high levels of x-radiation. The skirt is formed as a continuous sidewall 51, and is dimensioned to encompass the forward region of the tube. Being formed of x-ray absorbing gasket material, it exhibits a degree of resilience. A snug fit on the tube is desired, but is not essential. This embodiment also incorporates the aforedescribed piercings.

The skirt is of a thickness "C" which is substantially equal to the thickness "A" of the basic gasket 21, and as such affords adequate shielding for the peripheral region immediately rearward of the face per se. The skirt length "D" extending rearward from the perimeter of the face 13, is determined by experimentation to cover the spread of radiation to be shielded in the specific CRT types meriting special attention.

The aforenoted x-ray absorbing glass cover plate 33 evidences a thickness "E" sufficient to provide adequate attenuation. Two factors determining thickness are: attenuating characteristics of the glass and the severity of the x-radiation to be attenuated.

The described projection CRT, incorporating the compact structural combination of the invention, provides a markedly improved tube having beneficial x-ray absorbing properties. The use of this improved tube facilitates the construction of a more compact projection system, as it eliminates the need for separate shielding elements normally contained therein. In addition, the combination of the invention reduces optical reflectance thereby providing a noticeable improvement in contrast.

While there has been shown and described what are at present considered the preferred embodiments of the invention, it will be obvious to those skilled in the art that various changes and modifications may be made therein without departing from the scope of the invention as defined by the appended claims.

We claim:

1. A cathode ray tube having x-ray absorbing means integrally associated with the face region thereof, said means being a combination comprising:

an open frame-like gasket of uniform predetermined thickness such being shaped as a one-piece continuous-wall member having an outer surface substantially conforming to the perimetrical shape of said face region and an inner surface circumscribing the utilized facial area of said tube, said gasket having a wall width defined by the material intermediate said outer and inner surfaces, the material thickness of said gasket being defined by front and rear surfaces with the rear surface thereof being adhered to the exterior peripheral region of said tube face area;

a substantially transparent cover plate of x-ray absorbing glass having front and rear surfaces and being of a size greater than said utilized facial area of said tube, said cover plate being superposed upon and peripherally adhered to the front surface of said gasket; and a confined layer of substantially transparent adhesive material completely filling the facial region encompassed by said gasket thereby effecting bonding of said cover plate to the face area of said tube, characterized in that the gasket is formed of a substantially resilient closed cell polymer composition impregnated with x-ray absorbing material, and in that said gasket has a plurality of discrete piercings extending through said outer and inner surfaces to provide self-closing port means therein.

2. The cathode ray tube according to claim 1 wherein said x-ray absorbing material in said gasket is at least one metal of the group consisting essentially of lead, tungsten, tantalum, and molybdenum.

3. The cathode ray tube according to claim 2 wherein said gasket x-ray absorbing material is lead in the amount of substantially 8 to 15 percent by volume.

4. The cathode ray tube according to claim 2 wherein said gasket x-ray absorbing material is tungsten in the amount of substantially 6 to 10 percent by volume.

5. The cathode ray tube according to claim 2 wherein said gasket x-ray absorbing material is tantalum in the amount of substantially 7 to 11 percent by volume.

6. The cathode ray tube according to claim 2 wherein said gasket x-ray absorbing material is molybdenum in the amount of substantially 10 to 14 percent by volume.

7. The cathode ray tube according to claim 1 wherein the composition of said resilient gasket is silicone rubber.

8. The cathode ray tube according to claim 1 wherein the front surface of said cover plate has a deposition of anti-reflection coating thereon.

9. The cathode ray tube according to claim 1 wherein said gasket has an integral skirt portion formed as a continuous sidewall extending rearward therefrom in a manner encompassing the frontal portion of said tube, said skirt portion having x-ray absorbing properties to provide additional shielding for said frontal portion.

* * * * *